US 9,963,034 B2

(12) United States Patent
Fujimaki (10) Patent No.: US 9,963,034 B2
(45) Date of Patent: May 8, 2018

(54) VEHICLE SPEED LIMIT DISPLAY DEVICE

(71) Applicant: TOYOTA JIDOSHA KABUSHIKI KAISHA, Toyota-shi (JP)

(72) Inventor: Yusuke Fujimaki, Nisshin (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 4 days.

(21) Appl. No.: 15/152,335

(22) Filed: May 11, 2016

(65) Prior Publication Data
US 2016/0332517 A1    Nov. 17, 2016

(30) Foreign Application Priority Data

May 11, 2015  (JP) .................................. 2015-096793

(51) Int. Cl.
| | |
|---|---|
| B60K 35/00 | (2006.01) |
| G08G 1/0962 | (2006.01) |
| G06K 9/00 | (2006.01) |
| G08G 1/0967 | (2006.01) |

(52) U.S. Cl.
CPC .......... *B60K 35/00* (2013.01); *G06K 9/00818* (2013.01); *G08G 1/09623* (2013.01); *G08G 1/096783* (2013.01); *B60K 2350/1072* (2013.01)

(58) Field of Classification Search
CPC ............ B60K 35/00; B60K 2350/1072; G06K 9/00818; G08G 1/09623; G08G 1/096783
See application file for complete search history.

(56) References Cited

U.S. PATENT DOCUMENTS

| | | | | | |
|---|---|---|---|---|---|
| 5,844,505 | A | * | 12/1998 | Van Ryzin | ......... G01C 21/3602 340/905 |
| 6,111,498 | A | * | 8/2000 | Jobes, I | .................... G07C 5/10 340/435 |
| 6,125,323 | A | * | 9/2000 | Nimura | ................... G01C 21/30 340/988 |
| 6,154,703 | A | * | 11/2000 | Nakai | ................ G01C 21/3629 340/988 |

(Continued)

FOREIGN PATENT DOCUMENTS

| | | |
|---|---|---|
| DE | 10 2012 203 505 A1 | 9/2012 |
| DE | 10 2012 025 067 A1 | 6/2014 |

(Continued)

*Primary Examiner* — Joseph Feild
*Assistant Examiner* — Willard Edwards, Jr.
(74) *Attorney, Agent, or Firm* — Oblon, McClelland, Maier & Neustadt, L.L.P.

(57) ABSTRACT

A speed limit display device for a vehicle, includes an indicator configured to display information related to a speed limit of a road; an image obtaining device configured to capture an image of a landscape and obtain image data of the landscape; and an electronic control unit configured to detect the speed limit indicated on a traffic sign in the captured landscape, and display the speed limit on the indicator. The electronic control unit is configured to i) determine whether a predetermined condition is satisfied when the traffic sign is detected, the predetermined condition including a condition that a distance between the vehicle and the traffic sign be less than a predetermined distance, ii) display the detected speed limit when the predetermined condition is satisfied, and iii) not display the detected speed limit when the predetermined condition is not satisfied.

6 Claims, 7 Drawing Sheets

(56) References Cited

U.S. PATENT DOCUMENTS

| | | | | |
|---|---|---|---|---|
| 7,327,239 | B2* | 2/2008 | Gallant | B60K 35/00 |
| | | | | 116/37 |
| 7,796,081 | B2* | 9/2010 | Breed | B60N 2/2863 |
| | | | | 340/435 |
| 8,818,618 | B2* | 8/2014 | Follmer | G06Q 10/10 |
| | | | | 701/33.4 |
| 8,825,277 | B2* | 9/2014 | McClellan | G06Q 10/06 |
| | | | | 701/32.2 |
| 8,878,694 | B2* | 11/2014 | Davito | G08G 1/0962 |
| | | | | 340/441 |
| 2006/0028330 | A1* | 2/2006 | Gallant | B60K 35/00 |
| | | | | 340/441 |
| 2009/0034798 | A1 | 2/2009 | Mueller-Schneiders et al. | |
| 2009/0208058 | A1* | 8/2009 | Schofield | G06K 9/00818 |
| | | | | 382/103 |
| 2013/0006469 | A1* | 1/2013 | Green | G07C 5/008 |
| | | | | 701/36 |

FOREIGN PATENT DOCUMENTS

| | | |
|---|---|---|
| DE | 10 2014 217 877 A1 | 3/2015 |
| EP | 1 327 969 A1 | 7/2003 |
| EP | 2 023 265 A1 | 2/2009 |
| JP | 2010-205160 A | 9/2010 |
| JP | 2012-185076 A | 9/2012 |
| WO | WO 2014/115563 A1 | 7/2014 |

* cited by examiner

VEHICLE SPEED LIMIT DISPLAY DEVICE

INCORPORATION BY REFERENCE

The disclosure of Japanese Patent Application No. 2015-096793 filed on May 11, 2015 including the specification, drawings and abstract is incorporated herein by reference in its entirety.

BACKGROUND

1. Field of the Disclosure

The present disclosure relates to a vehicle speed limit display device that displays a speed limit indicated on a traffic sign to an occupant (mainly a driver) of a vehicle.

2. Description of Related Art

A traffic sign (a road sign) that displays information related to a speed limit for a vehicle traveling on a road is installed on the road. Japanese Patent Application Publication No. 2010-205160 (JP 2010-205160 A) describes a speed limit display device for a vehicle, which displays a speed limit indicated on this traffic sign. This device recognizes a traffic sign in an image based on data of an image of the landscape in front of the vehicle that is captured by a camera mounted on the vehicle, and displays this recognized traffic sign on a display provided in a position visible by a driver of the vehicle.

There are cases in which an expressway is provided parallel to a general road. In this case, a camera of a speed limit display device for a vehicle traveling on the expressway may capture a traffic sign intended for a vehicle traveling on the general road (i.e., a traffic sign for the general road). In this case, the speed limit display device may end up displaying the speed limit indicated on the traffic sign for the general road on a display, which is undesirable. Similarly, a speed limit display device for a vehicle traveling on the general road may end up displaying the speed limit indicated on a traffic sign intended for the expressway that is provided parallel to the general road, which is also undesirable.

BRIEF SUMMARY

The present disclosure thus provides a speed limit display device for a vehicle, which reduces the likelihood inaccurately displaying a speed limit.

One aspect of the present disclosure relates to a speed limit display device for a vehicle. This speed limit display device includes an indicator mounted in the vehicle, the indicator configured to display information related to a speed limit of a road on which the vehicle is traveling; an image obtaining device configured to capture an image of a landscape in a direction in which the vehicle is traveling and obtains image data of the landscape; and a processing portion configured to detect the speed limit indicated on a traffic sign in the landscape based on the image data, and display the speed limit on the indicator. The processing portion is configured to determine whether a predetermined condition is satisfied when the traffic sign is detected based on the image data, the predetermined condition including a condition that a distance between the vehicle and the traffic sign be less than a predetermined distance. The processing portion is also configured to display the speed limit on the indicator when it is determined that the predetermined condition is satisfied. The processing portion is also configured to not display the detected speed limit on the indicator when it is determined that the predetermined condition is not satisfied.

As a result, when a traffic sign is installed near a road on which a vehicle is traveling and this traffic sign is a traffic sign that indicates a speed limit that should be applied to the vehicle, the speed limit indicated on the traffic sign is able to be displayed on the speed limit display device. Also, when a traffic sign is installed away from a road on which a vehicle is traveling and there is a possibility that this sign is not a traffic sign that indicates a speed limit that should be applied to the vehicle, the speed limit indicated on the traffic sign is able to be prevented from being displayed on the speed limit display device. As a result, the likelihood that a speed that is not a speed limit that should be applied will be displayed by the speed limit display device is able to be reduced.

The predetermined condition may include a condition that the speed limit is equal to or higher than a speed threshold value. Also, the speed threshold value may be set to a value equal to or greater than a speed that is lower, by a predetermined value, than a speed being displayed by the indicator at a time when the speed limit is detected.

As a result, it is possible to determine whether to display the detected speed limit on the speed limit display device, based on the speed limit that is being displayed on the indicator.

The processing portion may be configured to set the predetermined distance larger when the speed limit is higher than a predetermined speed, than when the speed limit is equal to or lower than the predetermined speed.

The distance between the vehicle and a traffic sign installed on the road on which the vehicle is traveling tends to be greater when the width of the road is wider. In addition, the speed limit indicated on the traffic sign installed on the road also tends to be higher when the width of the road is wider. Therefore, when the speed limit indicated on the traffic sign is high, the width of the road is wide, so the distance between the vehicle and the traffic sign tends to be large.

Therefore, it is possible to accurately determine whether the detected speed limit is a speed limit that should be displayed on the speed limit display device, by setting the predetermined distance larger when the detected speed limit is higher than a predetermined speed than when the detected speed limit is equal to or lower than the predetermined speed.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein:

FIG. 6 is a view illustrating speed limit displays by the speed limit display device shown in FIG. 1 and the like;

FIG. 8 is a view illustrating speed limit displays by the speed limit display device shown in FIG. 1 and the like;

FIG. 10 is a view illustrating speed limit displays by the speed limit display device shown in FIG. 1 and the like.

DETAILED DESCRIPTION OF EMBODIMENTS

Hereinafter, a speed limit display device according to example embodiments of the present disclosure will be described with reference to the accompanying drawings.

Figure 1:
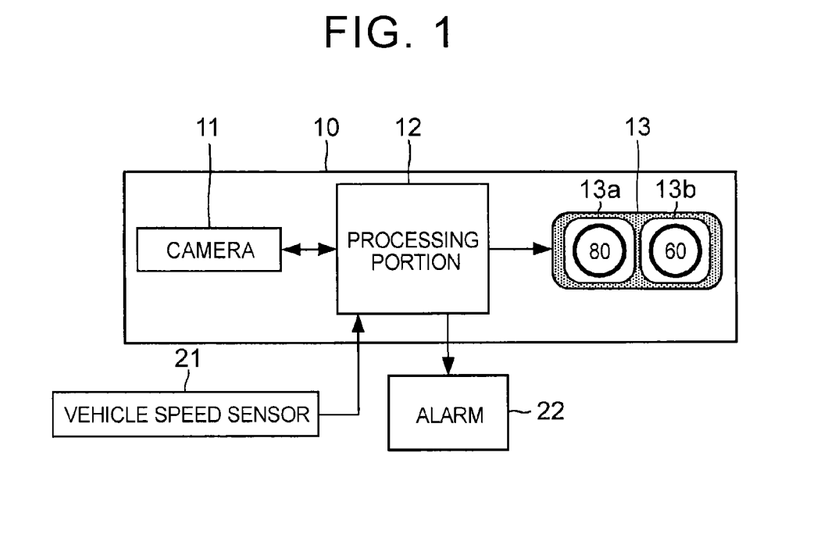
FIG. 1 is a block diagram schematically showing a speed limit display device for a vehicle according to an example embodiment of the present disclosure.

FIG. 1 is a block diagram schematically showing a speed limit display device (hereinafter, simply referred to as "execution device") 10 according to an example embodiment of the present disclosure. The execution device 10 is mounted in a vehicle (an automobile, a vehicle). The execution device 10 includes a camera (an image obtaining device) 11, a processing portion 12, and a display (an indicator) 13.

Figure 2:
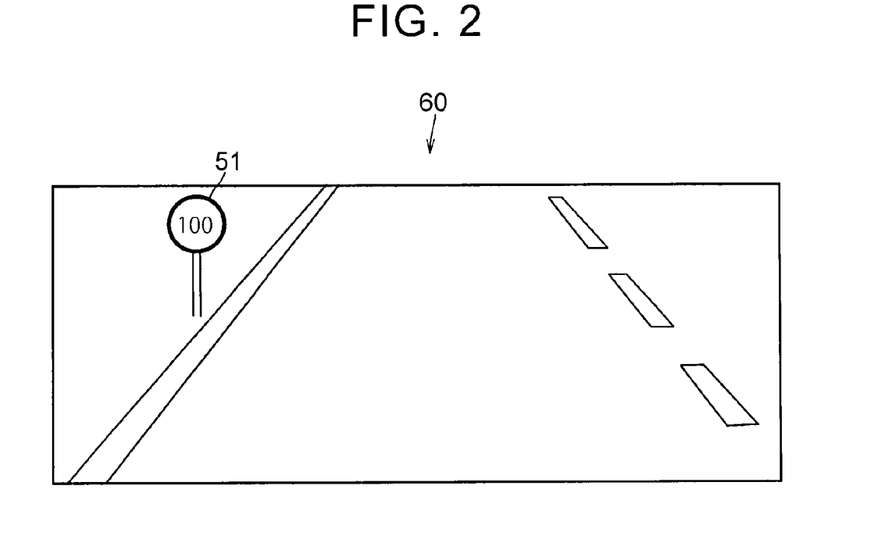
FIG. 2 is a view of an image (a captured image) captured by a camera shown in FIG. 1.

The camera 11 is fixed to a stay or the like of an inner rearview mirror (a so-called room mirror) of a vehicle body front portion. An optical axis of the camera 11 is aligned with a vehicle body front-rear direction (vehicle advancing direction) when the camera 11 is fixed to the vehicle body. Therefore, the camera 11 is able to obtain an image (image data) 60 of the landscape in the vehicle advancing direction (in front of the vehicle) by capturing the landscape, as shown in FIG. 2. Upon receiving a capture command from the processing portion 12, the camera 11 captures an image of the landscape in front of the vehicle. The camera 11 is a CCD camera, for example.

Figure 3A:
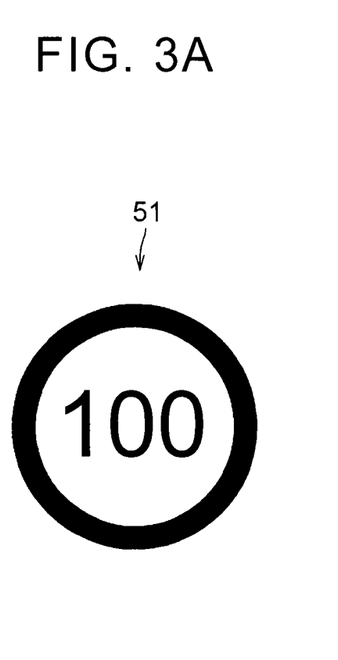
FIG. 3A is a view of a standard traffic sign.
Figure 3B:
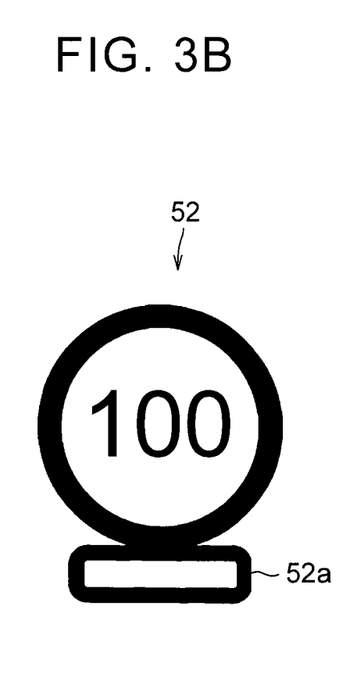
FIG. 3B is a view of a traffic sign with a supplemental sign.

Traffic signs 51 and 52 and the like indicating a maximum speed limit (hereinafter, simply referred to as "speed limit") for a vehicle shown in FIG. 3 are installed near the road (on the side of the road or above the road or the like). The traffic sign 51 shown in FIG. 3A is a traffic sign (a standard traffic sign) without a supplemental sign that indicates a condition under which the speed limit (a standard speed limit) indicated on the traffic sign 51 applies. On the other hand, the traffic sign 52 shown in FIG. 3B is a traffic sign with a supplemental sign 52a (a traffic sign with a supplemental sign, a supplemented sign) that indicates a condition under which the speed limit (a supplemental speed limit) indicated on the traffic sign 52 applies. The conditions under which the speed limits apply here include, for example, conditions regarding the weather, class of vehicle, and time of day or night and the like.

The processing portion 12 is an electronic control unit (ECU) that includes a well-known microcomputer that includes RAM (a storage element), ROM, and a CPU and the like. The processing portion 12 includes circuitry configured to detect (recognize) the traffic sign 51 or 52 by processing the image 60 (image data, captured image, or image signal) obtained by the camera 11, as will be described in detail later.

Furthermore, when the standard traffic sign 51 is detected in the captured image 60, the processing portion 12 detects (recognizes) a speed limit indicated on the detected standard traffic sign 51 as a standard speed limit Vst_new, and determines whether to display this detected standard speed limit Vst_new on the display 13, as will be described in detail later. Moreover, when the traffic sign 52 with a supplemental sign is detected in the captured image 60 as well, the processing portion 12 detects (recognizes) a speed limit indicated on the detected traffic sign 52 with a supplemental sign as a supplemental speed limit Vsub_new, and determines whether to display this detected supplemental speed limit Vsub_new on the display 13, as will be described in detail later.

The display 13 is provided in a position visible from a driver's seat of the vehicle (such as in a meter cluster panel, for example). As shown in FIG. 1, the display 13 includes a first display portion 13a that displays a main speed limit (the standard speed limit), and a second display portion 13b that displays a supplemental speed limit (the supplemental speed limit). The display portions 13a and 13b display the standard speed limit and the supplemental speed limit, respectively, according to a display command of the processing portion 12.

A vehicle speed sensor 21 is configured to detect a speed of the vehicle (a vehicle speed), and output a signal indicative of this vehicle speed SPD. The signal output from the vehicle speed sensor 21 is input to the processing portion 12. The processing portion 12 obtains the vehicle speed SPD based on the input signal.

An alarm 22 issues a warning by a sound in response to a command from the processing portion 12.

Next, the operation of the execution device 10 structured as described above will be described. In actuality, this operation is realized by the CPU provided in the processing portion 12 of the execution device 10 (hereinafter, simply referred to as "CPU") executing processes described next according to programs (instructions) stored in the ROM.

In this example, when an ignition switch is turned on, data Vst of the standard speed limit and data Vsub of the supplemental speed limit are erased from the RAM. That is, data indicating that the data Vst of the standard speed limit and the data Vsub of the supplemental speed limit are invalid is stored in a predetermined region of the RAM as the data Vst of the standard speed limit and the data Vsub of the supplemental speed limit.

Figure 4:
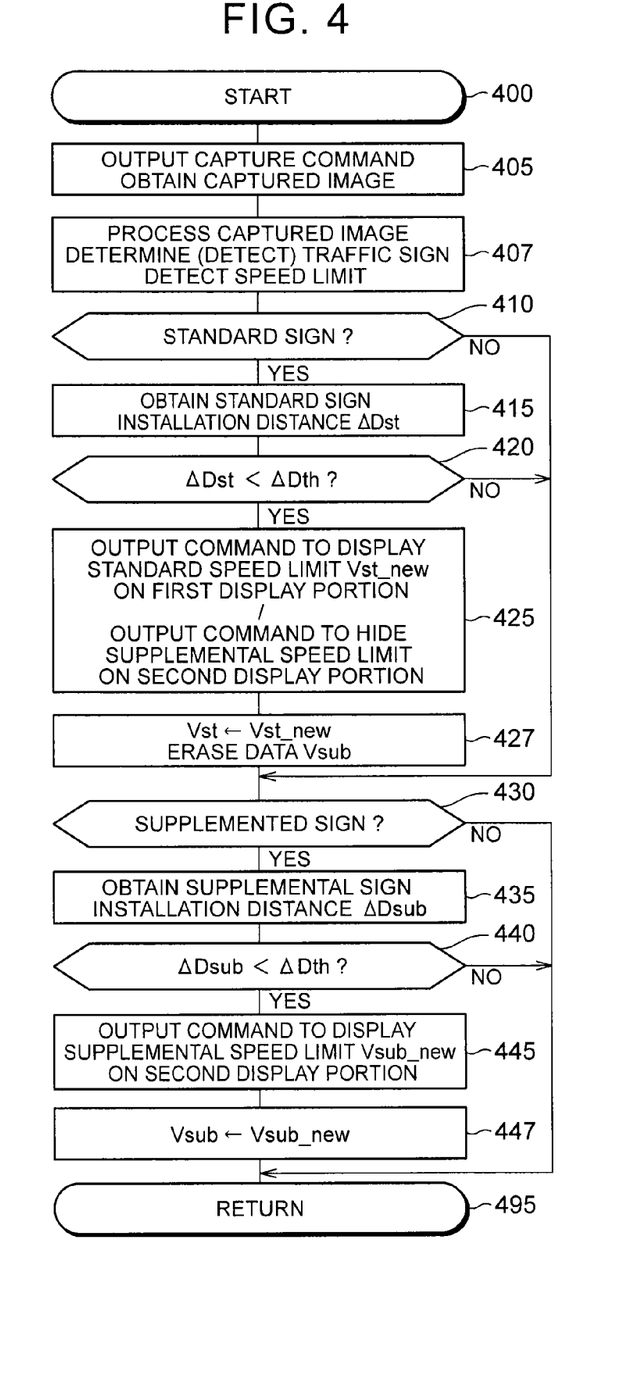
FIG. 4 is a flowchart illustrating a routine executed by a processing portion (CPU) shown in FIG. 1.

The CPU is configured to repeatedly execute the processes in the routine shown by the flowchart in FIG. 4 each time a predetermined period of time (e.g., 0.1 second) passes, when the ignition switch is on. Therefore, at a predetermined timing, the CPU starts processing from step 400 in FIG. 4, and then performs steps 405 and 407 that will be described later, in order.

Step 405: The CPU The CPU outputs a capture command to the camera 11, directs the camera 11 to capture an image, and obtains the captured image (image data) 60 captured by the camera 11.

Step 407: The CPU processes the captured image 60 obtained in step 405 by a well-known method (see JP 2010-205160 A, for example), and determines whether the traffic sign 51 and/or 52 indicating the speed limit is included in the captured image 60 based on the data of the processed captured image 60. Furthermore, if it is determined that the standard traffic sign 51 is included in the captured image 60 (i.e., if the CPU recognizes (detects) the standard traffic sign 51 in the captured image 60), the CPU detects the speed limit indicated on the standard traffic sign 51 as a standard speed limit Vst_new. In addition, if it is determined that the traffic sign 52 with a supplemental sign is included in the captured image 60 (i.e., if the CPU recognizes (detects) the traffic sign 52 with a supplemental sign in the captured image 60), the CPU detects the speed limit indicated on the traffic sign 52 with a supplemental sign as a supplemental speed limit Vsub_new.

Next, the CPU proceeds on to step 410 where it determines whether the standard traffic sign 51 is included in the captured image 60, based on the determination result in step 407. If the standard traffic sign 51 is included in the captured image 60, the CPU makes a determination of "Yes" in step 410 and proceeds on to step 415.

In step 415, the CPU obtains a distance between the vehicle and the standard traffic sign 51 in the captured image 60 (hereinafter, referred to as the "standard sign installation distance ΔDst").

The distance between the vehicle and the traffic sign (hereinafter, referred to as the "sign installation distance ΔD") may be obtained in the manner described below, for example. The sign installation distance ΔD is the "standard sign installation distance ΔDst" described above, or a "supplemental sign installation distance ΔDsub" that will be described later.

Figure 5:
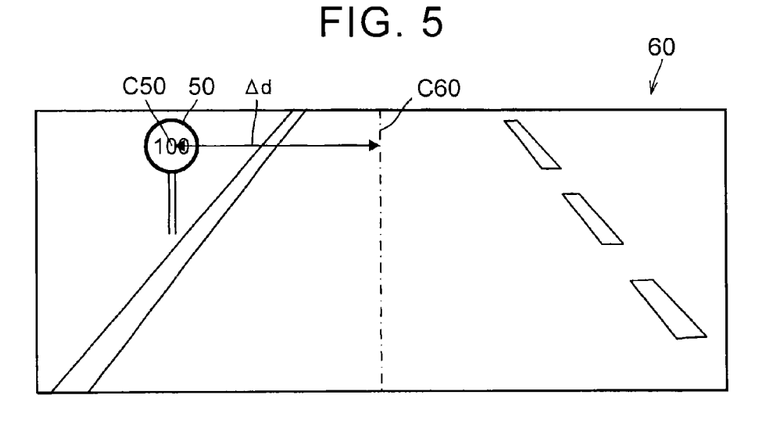
FIG. 5 is a view illustrating a method for obtaining a sign installation distance.

As illustrated in FIG. 5, when it is assumed that the captured image 60 is displayed on a specific screen (display), the distance between the vehicle and the traffic sign in the vehicle advancing direction may be regarded as having reached a certain specified distance when a diameter of the traffic sign on the display screen matches a certain constant diameter (hereinafter, also referred to as the "diameter matching point"). This is based on the fact that the diameter of the traffic sign is substantially constant.

Therefore, at the diameter matching point, the relationship between the actual sign installation distance ΔD and a distance Δd between a center C50 of a traffic sign 50 on the specific screen and a center line C60 that extends vertically through the center of the specific screen, is measured in advance, and this relationship is stored in the ROM.

Then, when the diameter matching point arrives while the vehicle is actually traveling, the CPU obtains the distance Δd at this diameter matching point, and obtains the actual sign installation distance ΔD from this distance Δd and the relationship described above stored in the ROM. The actual sign installation distance ΔD obtained at this time is the distance between the traffic sign and the vehicle when the vehicle is closest to the traffic sign.

The CPU may also regard the distance between the vehicle and the traffic sign in the vehicle advancing direction as having reached the certain specified distance by a well-known image processing method of the image 60 using a well-known distance measurement sensor. Furthermore, the image 60 may be converted into data that gives an overhead view by a well-known image processing method, and obtain the sign installation distance ΔD from this data.

Next, the CPU proceeds on to step 420 where the CPU determines whether the standard sign installation distance ΔDst obtained in step 415 is shorter than a predetermined distance ΔDth. This predetermined distance ΔDth is set to a value that is definitely smaller than the distance between the vehicle and a traffic sign for a road that is different from the road on which the vehicle is traveling.

If the standard sign installation distance ΔDst is shorter than the predetermined distance ΔDth, the CPU makes a determination of "Yes" in step 420 and performs steps 425 and 427 described below, in order.

Step 425: The CPU outputs a command (a display command) to display the standard speed limit Vst_new newly detected in step 407 on the first display portion 13*a*, and outputs a command (a hide command) to stop displaying the supplemental speed limit on the second display portion 13*b*. As a result, the newly detected standard speed limit Vst_new is displayed on the first display portion 13*a*, and the supplemental speed limit stops being displayed on the second display portion 13*b*.

Step 427: The CPU stores the standard speed limit Vst_new newly detected in step 407 in the RAM as the data Vst of the standard speed limit being displayed on the first display portion 13*a*, and erases the data Vsub of the supplemental speed limit being displayed on the second display portion 13*b* from the RAM. Then, the CPU proceeds on to step 430.

On the other hand, if the standard traffic sign 51 is not included in the captured image 60 obtained in step 405, the CPU makes a determination of "No" in step 410 and proceeds directly on to step 430. In this case, the display of the standard speed limit on the first display portion 13*a* is not changed, and the current display on the first display portion 13*a* is continued.

Moreover, even if the standard traffic sign 51 is included in the obtained captured image 60, when the standard sign installation distance ΔDst is equal to or greater than the predetermined distance ΔDth, the CPU makes a determination of "No" in step 420 and proceeds directly on to step 430. In this case as well, the display of the standard speed limit on the first display portion 13*a* is not changed, and the current display on the first display portion 13*a* is continued.

Upon proceeding to step 430, the CPU determines whether the traffic sign 52 with a supplemental sign is included in the captured image 60. If the traffic sign 52 with a supplemental sign is included in the captured image 60, the CPU makes a determination of "Yes" in step 430 and proceeds on to step 435.

Upon proceeding to step 435, the CPU obtains a distance between the vehicle and the traffic sign 52 with a supplemental sign in the captured image 60 (hereinafter, referred to as "supplemental sign installation distance ΔDsub"). This supplemental sign installation distance ΔDsub is obtained by a method similar to that for obtaining the sign installation distance ΔD.

Next, the CPU proceeds on to step 440 where it determines whether the supplemental sign installation distance ΔDsub obtained in step 435 is less than the predetermined distance ΔDth. If the supplemental sign installation distance ΔDsub is less than the predetermined distance ΔDth, the CPU makes a determination of "Yes" in step 440, and performs steps 445 and 447 described below, in order.

Step 445: The CPU outputs a command (a display command) to display the supplemental speed limit Vsub_new newly detected in step 407 on the second display portion 13*b*. As a result, the newly detected supplemental speed limit Vsub_new is displayed on the second display portion 13*b*.

Step 447: The CPU stores the supplemental speed limit Vsub_new newly detected in step 407 in the RAM as the data Vsub of the supplemental speed limit being displayed on the second display portion 13*b*. Then, the CPU proceeds on to step 495 where this cycle of the routine ends.

If the traffic sign 52 with a supplemental sign is not included in the captured image 60, the CPU makes a determination of "No" in step 430 and proceeds directly on to step 495 where this cycle of the routine ends. In this case, the display of the supplemental speed limit speed limit on the second display portion 13*b* is not changed, and the current display on the second display portion 13*b* is continued.

Moreover, even if the traffic sign 52 with a supplemental sign is included in the obtained captured image 60, if the supplemental sign installation distance ΔDsub is equal to or greater than the predetermined distance ΔDth, the CPU makes a determination of "No" in step 440 and proceeds directly on to step 495 where this cycle of the routine ends. In this case as well, the display of the supplemental speed limit on the second display portion 13b is not changed, and the current display on the second display portion 13b is continued.

The operation of the execution device 10 is as described above. According to this execution device 10, when a vehicle 30 is traveling on a road under the circumstances shown in FIG. 6, for example, the speed limit is displayed on the display 13 in the manner described below.

Figure 6:
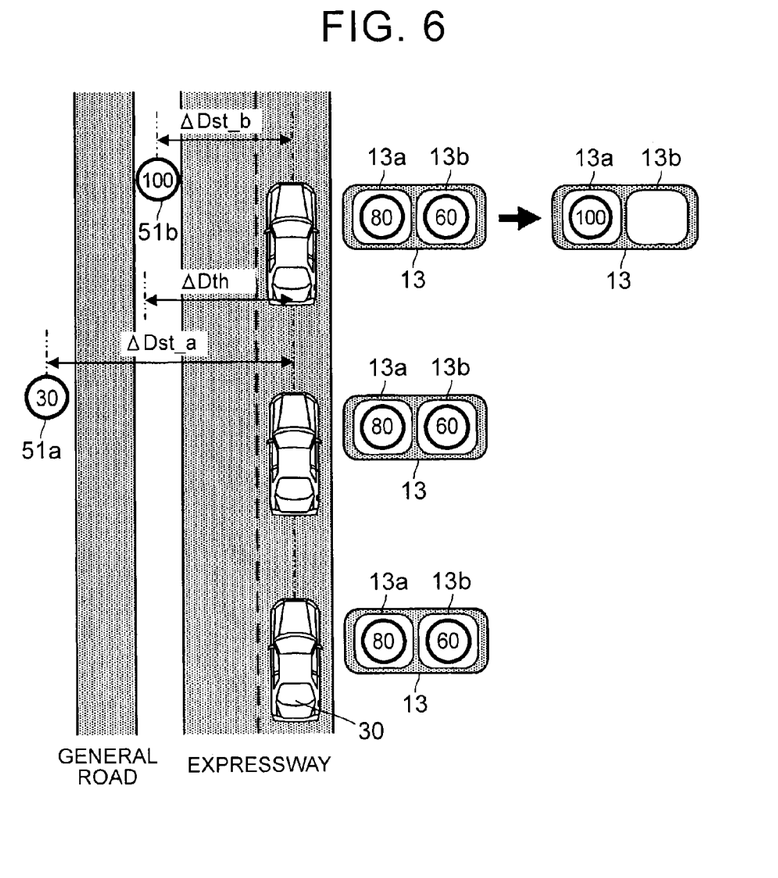

In the example shown in FIG. 6, a general road and an expressway extend parallel to each other. Furthermore, a standard traffic sign 51a for a general road that indicates a standard speed limit of 30 km/h is installed on the left side of the general road. In addition, a standard traffic sign 51b for an expressway that indicates a standard speed limit of 100 km/h is installed between the general road and the expressway. The standard traffic sign 51b is installed in front of the standard traffic sign 51a in the vehicle advancing direction.

A case will be assumed in which, at the point when the vehicle 30 is traveling in front of the traffic sign 51a on the expressway, a standard speed limit of 80 km/h is displayed on the first display portion 13a, and a supplemental speed limit of 60 km/h is displayed on the second display portion 13b.

When the vehicle 30 advances and approaches the traffic sign 51a, the camera 11 of the vehicle 30 captures an image of the landscape including this traffic sign 51a. At this time, the execution device 10 obtains a distance (a standard sign installation distance) ΔDst_a between the traffic sign 51a and the vehicle 30.

In the example shown in FIG. 6, this standard sign installation distance ΔDst_a is equal to or greater than the predetermined distance ΔDth, so the execution device 10 does not output a command to display the standard speed limit (=30 km/h) indicated on the traffic sign 51a on the first display portion 13a, even if the vehicle 30 passes by the traffic sign 51a.

That is, the CPU makes a determination of "Yes" in step 410 in FIG. 4, and makes a determination of "No" in step 420. Therefore, the standard speed limit displayed on the first display portion 13a remains 80 km/h.

When the vehicle 30 advances further and approaches the traffic sign 51b, the camera 11 of the vehicle 30 captures an image of the landscape including the traffic sign 51b. At this time, the execution device 10 obtains a distance (a standard sign installation distance) ΔDst_b between the traffic sign 51b and the vehicle 30.

In the example shown in FIG. 6, this standard sign installation distance ΔDst_b is less than the predetermined distance ΔDth, so when the vehicle 30 passes by the traffic sign 51b, the execution device 10 outputs a command to the display 13 to display the standard speed limit (=100 km/h) indicated on the traffic sign 51b on the first display portion 13a, as well as outputs a command to the display 13 to stop the supplemental speed limit from being displayed on second display portion 13b.

That is, the CPU makes a determination of "Yes" in both steps 410 and 420 in FIG. 4, and performs step 425. As a result, the standard speed limit displayed on the first display portion 13a switches from 80 km/h to 100 km/h, and the supplemental speed limit stops being displayed on the second display portion 13b.

In this way, with the execution device 10, a speed limit indicated on a traffic sign installed in a location equal to or greater than the predetermined distance ΔDth away (in the left-right direction of the vehicle) (i.e., a traffic sign that is not a traffic sign indicating a speed limit that should be applied; the traffic sign 51a in the example shown in FIG. 6) will not be displayed on the first display portion 13a.

On the other hand, a speed limit indicated on a traffic sign installed within the predetermined distance ΔDth (i.e., a traffic sign indicating a speed limit that should be applied; the standard traffic sign 51b in the example shown in FIG. 6) will be displayed on the first display portion 13a.

Therefore, a wrong speed limit is able to be prevented from being displayed on the display 13, and the correct speed limit is able to be reliably displayed on the display 13.

Figure 7:
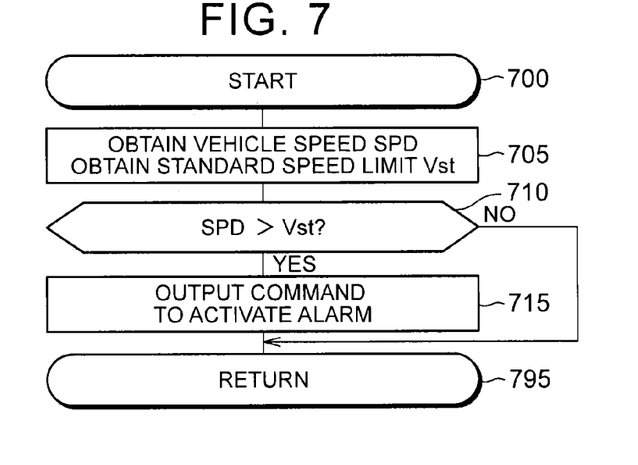
FIG. 7 is a flowchart illustrating a routine executed by the processing portion (CPU) shown in FIG. 1.

Moreover, the CPU of the processing portion 12 is configured to repeatedly execute the routine shown by the flowchart in FIG. 7 each time a predetermined period of time (e.g., 0.1 second) passes, when the ignition switch is on. Therefore, at a predetermined timing, the CPU starts processing from step 700 in FIG. 7 and proceeds on to step 705 where the CPU obtains the vehicle speed SPD and the standard speed limit Vst being displayed on the first display portion 13a. The vehicle speed SPD is obtained based on a signal output from the vehicle speed sensor 21.

Next, the CPU proceeds on to step 710 where it determines whether the vehicle speed SPD obtained in step 705 is higher than the standard speed limit Vst obtained in step 705.

If the vehicle speed SPD is higher than the standard speed limit Vst at the time when the CPU executes step 710, the CPU makes a determination of "Yes" in step 710 and proceeds on to step 715 where the CPU outputs a command to activate the alarm 22. Then, the CPU proceeds on to step 795 where this cycle of the routine ends.

On the other hand, if the vehicle speed SPD is equal to or lower than the standard speed limit Vst at the point when the CPU executes step 710, the CPU makes a determination of "No" in step 710 and proceeds on to step 795 where this cycle of the routine ends.

According to the routine described above, when the vehicle speed SPD is higher than the standard speed limit Vst being displayed on the first display portion 13a, an audible alarm that notifies the driver that the vehicle speed SPD is higher than the standard speed limit Vst is issued by the alarm 22.

Figure 8:
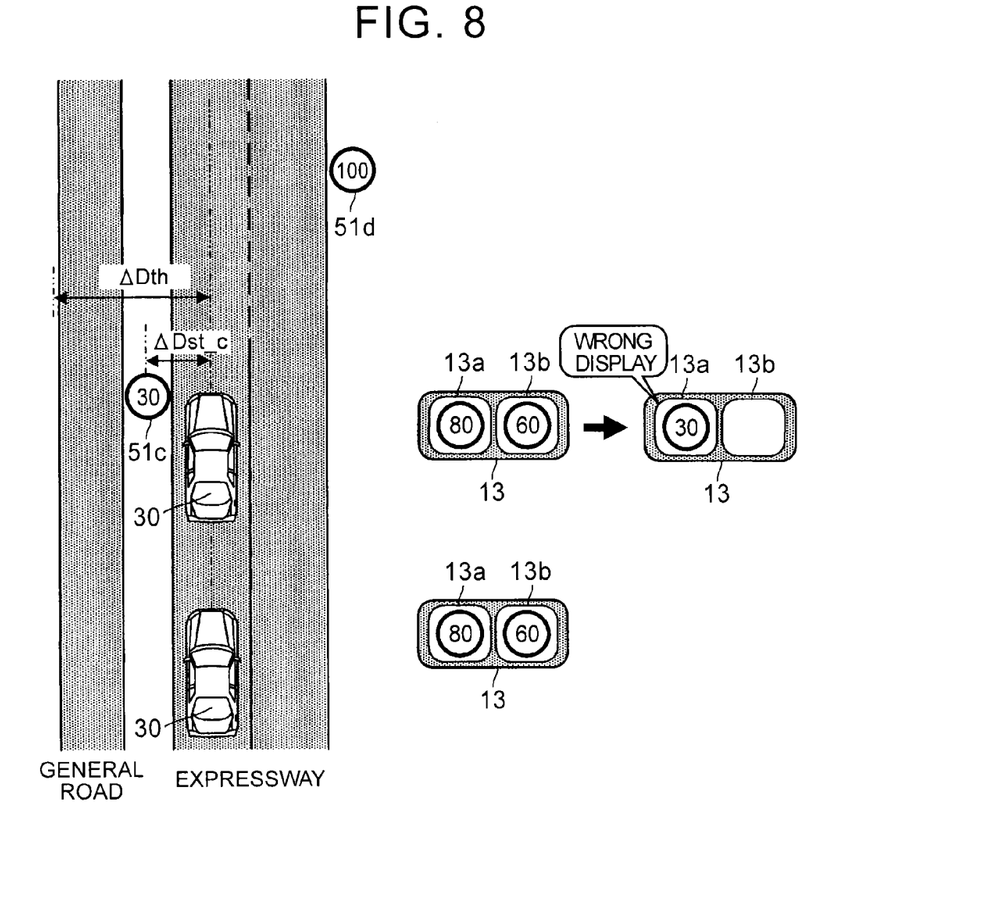

When a general road is parallel to an expressway, as shown in FIG. 8, a standard traffic sign 51c for a general road (the standard traffic sign indicating a standard speed limit of 30 km/h in the example shown in FIG. 8) may be set between the expressway and the general road. At this time, a distance (standard traffic sign installation distance) ΔDst_c between the standard traffic sign 51c and the vehicle 30 may also be less than the predetermined distance ΔDth.

In this case, if the standard speed limit (=30 km/h) indicated on the standard traffic sign 51c is displayed on the first display portion 13a, an excessively low standard speed limit (=30 km/h) will end up being displayed on the first display portion 13a even though the vehicle 30 is traveling on the expressway.

Therefore, the execution device 10 may display a speed limit on the display 13 in the manner described below. That is, the execution device 10 may be configured to determine whether to display a newly detected standard speed limit Vst_new on the first display portion 13a, based on the relationship between the newly detected standard speed limit Vst_new indicated on the standard traffic sign 51 and the standard speed limit Vst being displayed on the first display portion 13a, even if the standard sign installation distance ΔDst is less than the predetermined distance ΔDth.

Figure 9:
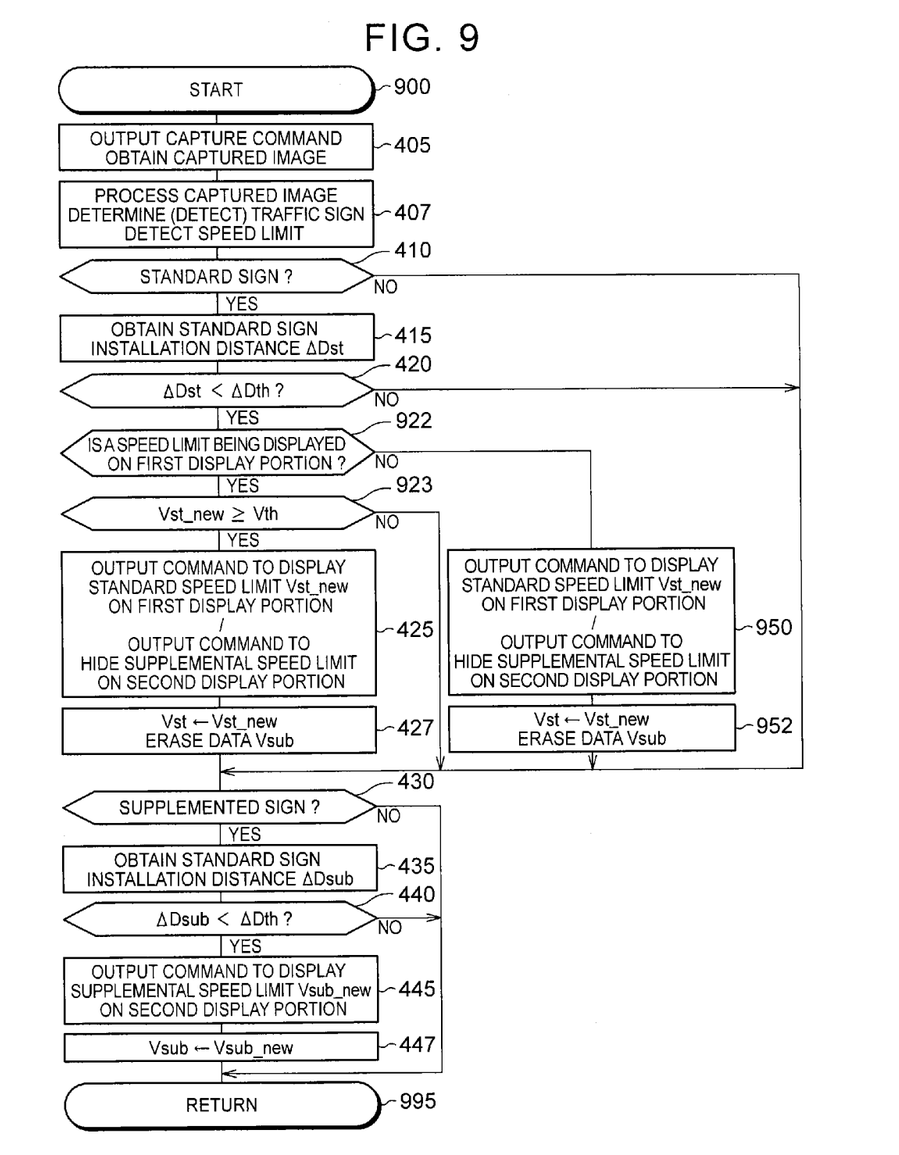
FIG. 9 is a flowchart illustrating another routine executed by the processing portion (CPU) shown in FIG. 1.

More specifically, the CPU provided in the processing portion 12 of the execution device 10 may be configured to repeatedly execute the routine shown by the flowchart in FIG. 9 each time a predetermined period of time passes, when the ignition switch is on.

The routine in FIG. 9 is the same as the routine in FIG. 4, except for the addition of steps 922, 923, 950, and 952. Therefore, a description of the steps other than these steps 922, 923, 950, and 952 will be omitted.

When the CPU makes a determination of "Yes" in step 420, the CPU proceeds on to step 922. Upon proceeding on to step 922, the CPU determines whether the standard speed limit is being displayed on the first display portion 13a.

If the standard speed limit is being displayed on the first display portion 13a at the time when the CPU executes step 922, the CPU makes a determination of "Yes" in step 922 and proceeds on to step 923.

Upon proceeding to step 923, the CPU determines whether the standard speed limit Vst_new newly detected in step 407 is equal to or greater than a speed threshold value Vth. Here, the speed threshold value Vth is a value (=Vst− V1) obtained by subtracting a predetermined value V1 from the standard speed limit Vst being displayed on the first display portion 13a. This predetermined value V1 is set to an appropriate positive value.

If the standard speed limit Vst_new newly detected in step 407 is equal to or greater than the speed threshold value Vth at the time when the CPU executes step 923, the CPU makes a determination of "Yes" in step 923, then performs steps 425 and 427 described above, in order, and then proceeds on to step 430. As a result, the standard speed limit Vst_new newly detected in step 407 is displayed on the first display portion 13a.

In contrast, if the standard speed limit Vst_new newly detected in step 407 is less than the speed threshold value Vth at the time when the CPU executes step 923, the CPU makes a determination of "No" in step 923 and proceeds directly on to step 430. In this case, the display of the standard speed limit on the first display portion 13a does not change, and the current display of the first display portion 13a is continued.

On the other hand, if the standard speed limit is not being displayed on the first display portion 13a at the time when the CPU executes step 922, the CPU makes a determination of "No" in step 922, and executes steps 950 and 952 described below, in order.

Step 950: The CPU outputs a command (a display command) to display the standard speed limit Vst_new newly detected in step 407 on the first display portion 13a, and outputs a command (a hide command) to stop displaying the supplemental speed limit on the second display portion 13b. As a result, the newly detected standard speed limit Vst_new is displayed on the first display portion 13a, and the supplemental speed limit stops being displayed on the second display portion 13b.

Step 952: The CPU stores the standard speed limit Vst_new newly detected in step 407 in the RAM as the data Vst of the standard speed limit being displayed on the first display portion 13a, and erases the data Vsub of the supplemental speed limit being displayed on the second display portion 13b from the RAM. Then, the CPU proceeds on to step 430.

According to this execution device 10, when a vehicle 30 is traveling on a road under the circumstances shown in FIG. 10, for example, the speed limit is displayed on the display 13 in the manner described below.

Figure 10:
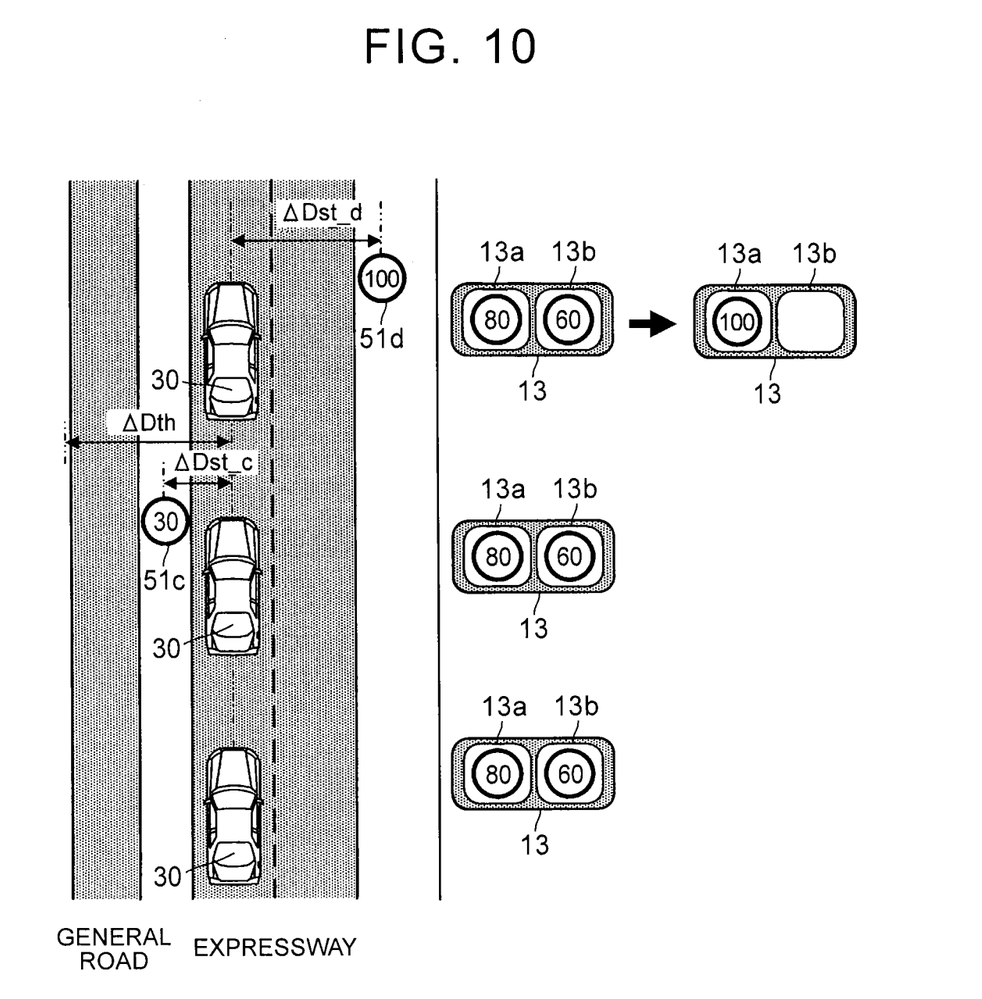

In the example shown in FIG. 10, the standard traffic sign 51c for a general road that indicates a standard speed limit of 30 km/h is installed between the general road and the expressway, and a standard traffic sign 51d for an expressway that indicates a standard speed limit of 100 km/h is installed on the right side of the expressway. The standard traffic sign 51d is installed in front of the standard traffic sign 51c in the vehicle advancing direction. In this example, a case is assumed in which a standard speed limit of 80 km/h is displayed on the first display portion 13a and a supplemental speed limit of 60 km/h is displayed on the second display portion 13b at the time when the vehicle 30 is traveling in front of the traffic sign 51c. In addition, the predetermined value V1 is set to 20 km/h.

When the vehicle 30 advances and approaches the traffic sign 51c, the camera 11 of the vehicle 30 captures an image of the landscape including this traffic sign 51c. At this time, the execution device 10 obtains a distance (a standard sign installation distance) ΔDst_c between the traffic sign 51c and the vehicle 30.

In the example shown in FIG. 10, this standard sign installation distance ΔDst_c is less than the predetermined distance ΔDth, so the execution device 10 determines whether the standard speed limit (=30 km/h) indicated on the traffic sign 51c is equal to or greater than the speed threshold value Vth. Here, the speed threshold value Vth is a value (=60 km/h) obtained by subtracting the predetermined value V1 (=20 km/h) from a first display speed limit (=80 km/h).

In this case, the standard speed limit (=30 km/h) indicated on the traffic sign 51c is less than the speed threshold value Vth (=60 km/h), so the execution device 10 does not output a command to display the standard speed limit indicated on the traffic sign 51c on the first display portion 13a, even when the vehicle 30 passes by the traffic sign 51c.

That is, the CPU makes a determination of "Yes" in all of steps 410, 420, and 922, and makes a determination of "No" in step 923 in FIG. 9. Thus, the standard speed limit displayed on the first display portion 13a remains 80 km/h.

When the vehicle 30 advances further and approaches the traffic sign 51d, the camera 11 of the vehicle 30 captures an image of the landscape including the standard traffic sign 51d. At this time, the execution device 10 obtains a distance (a standard sign installation distance) ΔDst_d between the traffic sign 51d and the vehicle 30.

In the example shown in FIG. 10, this standard sign installation distance ΔDst_d is less than the predetermined distance ΔDth, so the execution device 10 determines whether the standard speed limit (=100 km/h) indicated on the traffic sign 51d is equal to or greater than the speed threshold value Vth (=60 km/h).

In this case, the standard speed limit (=100 km/h) indicated on the traffic sign 51d is equal to or greater than the speed threshold value Vth (=60 km/h), so the execution device 10 outputs a command to the display 13 to display the standard speed limit indicated on the traffic sign 51d on the first display portion 13a.

That is, the CPU makes a determination of "Yes" in all of steps 410, 420, 922, and 923, and makes proceeds on to step 425 in FIG. 9.

Accordingly, if the standard speed limit indicated on the standard traffic sign 51 installed within the predetermined distance ΔDth is significantly lower than the standard speed limit displayed on the first display portion 13a, the standard speed limit indicated on the standard traffic sign 51 is not displayed on the first display portion 13a.

Therefore, a speed limit that is significantly lower than the actual speed limit is able to be prevented from being displayed on the first display portion 13a, even though the vehicle 30 is traveling is on an expressway.

When the vehicle 30 is traveling on a wide road (e.g., an expressway), the sign installation distance ΔD is relatively large. On the other hand, when the vehicle 30 is traveling on a narrow road (e.g., a general road), the sign installation distance ΔD is relatively small.

Therefore, if the predetermined distance is set relatively large as a result of taking into account the sign installation distance ΔD when the vehicle 30 is traveling on a wide road, then a traffic sign that does not indicate a speed limit for the vehicle 30 may end up erroneously being recognized as a traffic sign that indicates a speed limit for the vehicle 30, when the vehicle 30 is traveling on a narrow road.

Conversely, if the predetermined distance is set relatively small as a result of taking into account the sign installation distance ΔD when the vehicle 30 is traveling on a narrow road, then a traffic sign that indicates a speed limit for the vehicle 30 may end up erroneously being recognized as a traffic sign that does not indicate a speed limit for the vehicle 30, when the vehicle 30 is traveling on a wide road.

Therefore, the execution device 10 may be configured to set the predetermined distance according to the newly detected standard speed limit Vst_new. More specifically, the processing portion 12 of the execution device 10 sets the predetermined distance ΔDth larger when the newly detected standard speed limit Vst_new is large than it does when the newly detected standard speed limit Vst_new is small.

The standard speed limit typically tends to be higher the wider the road is. Therefore, when there is a high probability that the vehicle 30 is traveling on a wide road due to the fact that the newly detected standard speed limit Vst_new is high, the predetermined distance ΔDth is set to a large value. As a result, when the vehicle 30 is traveling on a wide road, the standard traffic sign 51 that indicates the standard speed limit for the vehicle 30 is able to be prevented from being erroneously determined to be a standard speed limit that does not indicate the standard speed limit for the vehicle 30.

On the other hand, when there is a high probability that the vehicle 30 is traveling on a narrow road due to the fact that the newly detected standard speed limit Vst_new is low, the predetermined distance ΔDth is set to a small value. As a result, when the vehicle 30 is traveling on a narrow road, the standard traffic sign 51 that does not indicate the standard speed limit for the vehicle 30 is able to be prevented from being erroneously determined to be a standard speed limit that indicates the standard speed limit for the vehicle 30.

In step 420 in FIG. 4, the execution device 10 described above compares the standard sign installation distance ΔDst to the predetermined distance ΔDth. However, instead of this, the execution device 10 may be configured to compare a length from the center C50 of the sign in the image to a center line C60 of the image, to a predetermined length corresponding to the predetermined distance. In this case, the execution device 10 makes a determination of "Yes" in step 420 if the length from the center C50 of the sign in the image to the center line C60 of the image is shorter than the predetermined distance in step 420 in FIG. 4.

Furthermore, in step 923 in FIG. 9, the execution device 10 described above compares the newly detected standard speed limit Vst_new to the speed threshold value Vth (=Vst−V1) obtained by subtracting the predetermined value V1 from the standard speed limit Vst being displayed on the first display portion 13a. However, instead of this, in step 923, the execution device 10 may also be configured to compare the newly detected standard speed limit Vst_new to the standard speed limit Vst being displayed on the first display portion 13a. In this case, the execution device 10 makes a determination of "Yes" in step 923 if the newly detected standard speed limit Vst_new is equal to or higher than the standard speed limit Vst.

As a result, a speed that is lower than the standard speed limit being displayed on the first display portion 13a is able to be prevented from being displayed on the first display portion 13a.

In addition, in step 923 in FIG. 9, the execution device 10 may be configured to compare the newly detected standard speed limit Vst_new to a value (Vst+V2) obtained by adding a predetermined value V2 (>0) to the standard speed limit Vst being displayed on the first display portion 13a. In this case, the execution device 10 makes a determination of "Yes" in step 923 if the newly detected standard speed limit Vst_new is equal to or greater than the value (Vst+V2) obtained by adding the predetermined value V2 to the standard speed limit Vst.

As a result, a speed that is lower than a speed that is higher, by the predetermined value V2, than the standard speed limit Vst being displayed on the first display portion 13a is able to be prevented from being displayed on the first display portion 13a.

When the vehicle speed SPD is higher than the standard speed limit Vst described on the first display portion 13a, the execution device 10 described above notifies the driver that the vehicle speed SPD is higher than the standard speed limit Vst by emitting a sound from the alarm 22. However, the execution device 10 may also notify the driver that the vehicle speed SPD is higher than the standard speed limit Vst by indicating that the vehicle speed SPD is higher than the standard speed limit Vst on the display 13. That is, the present disclosure may also be configured to notify the driver that the vehicle speed SPD is higher than the standard speed limit Vst by warning means that includes a sound or a display on the display 13.

As described above, the speed limit display device 10 according to this example embodiment of the present disclosure includes the indicator (the display) 13, the image obtaining device (the camera) 11, and the processing portion 12 that displays a speed limit (the standard speed limit and/or the supplemental speed limit) on the indicator 13.

The processing portion 12 detects the speed limit indicated on a captured traffic sign that is the traffic sign (the standard traffic sign and/or the supplemental traffic sign) 51 and/or 52 in the landscape captured by the image obtaining device 11, based on the image data obtained by the image obtaining device 11 (step 407 in FIG. 4), and determines whether a predetermined condition that includes a condition that a distance (the standard sign installation distance or the supplemental sign installation distance) ΔDst or ΔDsub between the captured traffic sign and the vehicle be less than the predetermined distance ΔDth, is satisfied when a captured traffic sign is detected based on the image data (i.e., when a determination of "Yes" is made in both steps 410 and 430 in FIG. 4).

When it is determined that the predetermined condition is satisfied (i.e., when a determination of "Yes" is made in step 420 in FIG. 4), the processing portion 12 displays the detected speed limit (the standard speed limit) Vst_new on the indicator 13 (step 425 in FIG. 4).

On the other hand, when it is determined that the predetermined condition is not satisfied (i.e., when a determination of "No" is made in step 420 in FIG. 4), the processing portion 12 does not display the detected speed limit Vst_new on the indicator 13.

Moreover, the predetermined condition includes a condition that the detected speed limit Vst_new be equal to or greater than the speed threshold value Vth (step 923 in FIG. 9), and the speed threshold value is set to a value equal to or greater than a speed that is lower, by the predetermined value V1, than the speed limit Vst being displayed on the indicator 13.

In addition, the predetermined distance ΔDth is set larger when the detected speed limit Vst_new is higher than a predetermined speed than it is when the detected speed limit Vst_new is equal to or lower than the predetermined speed.

As a result, the likelihood that a speed that is not the speed limit that should be applied will be displayed on the indicator 13 is able to be reduced.

The present disclosure is not limited to the example embodiments described above. That is, various modified examples may be employed within the scope of the present disclosure. For example, the indicator 13 may include only the first display portion 13a. In this case, the outputting and processing of the signals to the second display portion 13b in the various routines are omitted.

What is claimed is:

1. A speed limit display control device for a vehicle, comprising:
    an image obtaining device configured to obtain an image of a landscape in a direction in which the vehicle is traveling; and
    an electronic control unit configured to (i) detect a speed limit indicated on a traffic sign in the landscape based on the image, (ii) display the speed limit when a distance between the vehicle and the traffic sign is a predetermined distance or less, (iii) not display the speed limit when the distance between the vehicle and the traffic sign is greater than the predetermined distance, and (iv) set the predetermined distance larger when the speed limit is higher than a predetermined speed, than when the speed limit is equal to or lower than the predetermined speed.

2. The speed limit display control device according to claim 1, wherein the image obtaining device is a camera with an optic axis aligned with a vehicle body front-rear direction.

3. The speed limit display control device according to claim 1, wherein
    the electronic control unit is configured to detect in the landscape a supplemental speed limit indicated on a traffic sign with a speed limit and a condition in which the in the speed limit applies, and
    the electronic control unit is configured to display the speed limit on a first portion of the indicator and display the supplemental speed limit on a second portion of the indicator.

4. A vehicle comprising:
    the speed limit control display device according to claim 1; and
    an indicator mounted in the vehicle, the indicator configured to display information related to the speed limit detected by the electronic control unit.

5. The vehicle of claim 4, wherein the electronic control unit displays the speed limit on the indicator.

6. A speed limit display control method for a vehicle, the method comprising:
    obtaining with a camera an image of a landscape in a direction in which the vehicle is traveling;
    detecting with an electronic control unit a speed limit indicated on a traffic sign in the landscape based on the image;
    display the speed limit when a distance between the vehicle and the traffic sign is a predetermined distance or less;
    not displaying the speed limit when the distance between the vehicle and the traffic sign is greater than the predetermined distance; and
    setting with the electronic control unit the predetermined distance larger when the speed limit is higher than a predetermined speed, than when the speed limit is equal to or lower than the predetermined speed.

* * * * *